(12) United States Patent
Appleton

(10) Patent No.: US 6,491,393 B1
(45) Date of Patent: *Dec. 10, 2002

(54) TORIC CONTACT LENS MARKINGS

(75) Inventor: William J. Appleton, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/977,107

(22) Filed: Nov. 24, 1997

Related U.S. Application Data

(60) Provisional application No. 60/033,777, filed on Dec. 20, 1996.

(51) Int. Cl.⁷ .............................. G02C 7/02; G02C 7/04
(52) U.S. Cl. ..................... 351/176; 351/160 R; 351/177
(58) Field of Search ......................... 351/160 R, 160 H, 351/176, 177, 219; 264/2.1, 2.6, 2.7

(56) References Cited

U.S. PATENT DOCUMENTS

| 4,194,814 A | 3/1980 | Fischer et al. ............... 351/160 |
| 4,976,533 A | 12/1990 | Hahn et al. .................. 351/160 |
| 5,085,013 A | 2/1992 | Ascosi et al. .................. 51/277 |
| 5,500,695 A | 3/1996 | Newman ..................... 351/161 |

FOREIGN PATENT DOCUMENTS

| WO | 95/20483 | 8/1995 | |
| WO | 95/25981 | 9/1995 | ............ G02C/7/04 |

OTHER PUBLICATIONS

JP 08194193A (HOYA CORP), Jul. 30, 1996, Abstract only.

*Primary Examiner*—Jordan M. Schwartz
(74) *Attorney, Agent, or Firm*—John E. Thomas

(57) ABSTRACT

Toric contact lenses are provided with markings that enable identification of the offset between the cylindrical axis of the toric zone and the ballast axis. Surfaces of the lenses include two markings, a first identifiable marking that is aligned with the cylindrical axis, and a second identifiable marking that is aligned with the ballast axis.

13 Claims, 2 Drawing Sheets

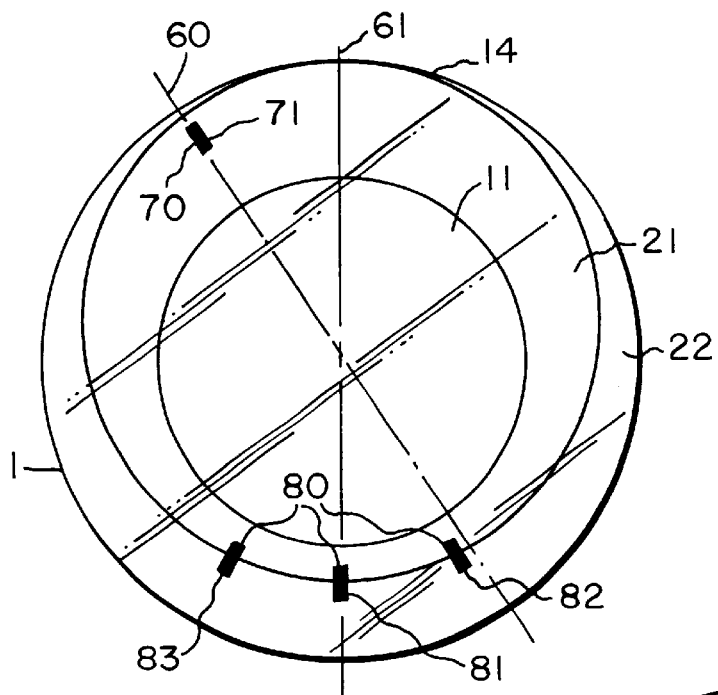
FIG. 1
FIG. 2
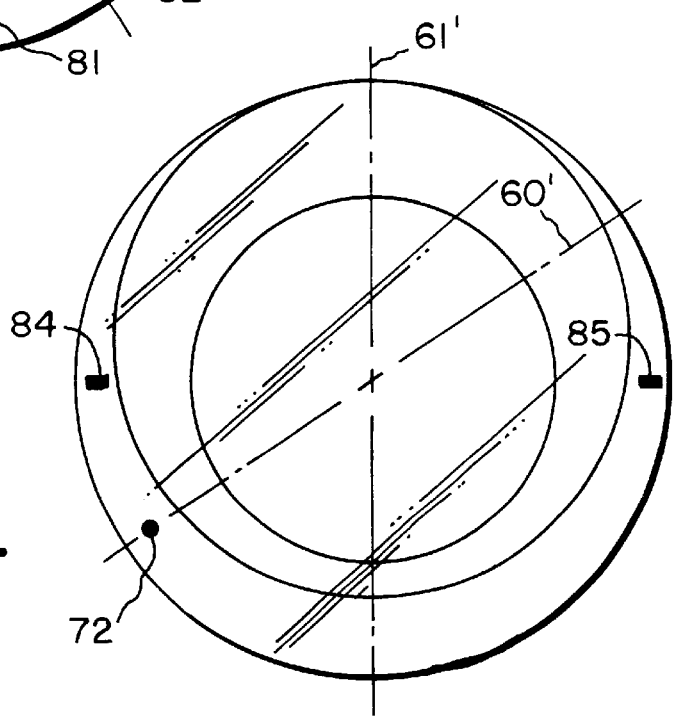
FIG. 3

TORIC CONTACT LENS MARKINGS

This application claims the benefit of provisional application No. 60/033,777, filed Dec. 20, 1996.

BACKGROUND OF THE INVENTION

This invention relates to markings for toric contact lenses. The markings are useful for identifying the offset between the cylindrical axis and the ballast axis.

Contact lenses having a toric optical zone (commonly referred to as "toric contact lenses") are used to correct refractive abnormalities of the eye associated with astigmatism. The toric optical zone provides cylindrical correction to compensate for the astigmatism. Since astigmatism requiring vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. The toric surface may be formed in either the posterior lens surface (back surface toric lens) or in the anterior lens surface (front surface toric lens).

Whereas spherical contact lenses may freely rotate on the eye, toric contact lenses have a ballast to inhibit rotation of the lens on the eye so that the cylindrical axis of the toric zone remains generally aligned with the axis of the astigmatism. For example, a section of the lens periphery may be thicker (or thinner) than another section to provide the ballast. Toric contact lenses are manufactured with a selected relationship (or offset) between the cylindrical axis of the toric optical zone and the orientation of the ballast. This relationship is expressed as the number of degrees (rotational angle) that the cylindrical axis is offset from the orientation axis of the ballast. Accordingly, toric contact lens prescriptions specify this offset, with toric lenses generally being offered in 5 or 10-degree increments ranging from 0° to 180°.

U.S. Pat. No. 4,976,533 discloses various prior methods for marking a toric contact lens, the markings being arranged in a manner that the ballast axis is identifiable. As an example, FIG. 2 of U.S. Pat. No. 4,976,533 illustrates a prior art toric contact lens including three visible line segments in a peripheral section of the lens, a first line segment lying on the ballast axis and two line segments arranged symmetrically about the first. As another example, FIGS. 3 and 5 of U.S. Pat. No. 4,976,533 disclose one or two line segments lying perpendicular to the ballast axis. Such lenses are useful for measuring the rotation of the lens on the eye, i.e., a practitioner can evaluate the lens when placed on the eye, and use the markings to measure any deviation of the lens from its intended rotational position, and to evaluate whether rotation of the lens on the eye is effectively inhibited as intended.

SUMMARY OF THE INVENTION

The invention relates to markings for toric contact lenses that include a posterior surface and an anterior surface, one of the surfaces including a toric optical zone having a cylindrical axis, and the surfaces being shaped to form a ballast oriented about a ballast axis. The lens surfaces include two markings, a first identifiable marking that is aligned with the cylindrical axis, and a second identifiable marking that is aligned with the ballast axis. The two markings provide a simple and reliable means to identify the offset between the cylindrical axis of the toric optical zone and the ballast axis.

The invention also provides a method for marking a toric contact lens with identifiable markings, that comprises applying a first identifiable marking to a surface of the contact lens that is aligned with the cylindrical axis, and applying a second identifiable marking to a surface of the contact lens that is aligned with the ballast axis.

BRIEF DESCRIPTION OF THE DRAWINGS

FIG. 1 is a schematic cross-sectional view of a representative toric contact lens.

FIGS. 2 to 3 are schematic front views of a toric contact lens according to various embodiments of the invention.

DETAILED DESCRIPTION OF PREFERRED EMBODIMENTS

Figure 4:
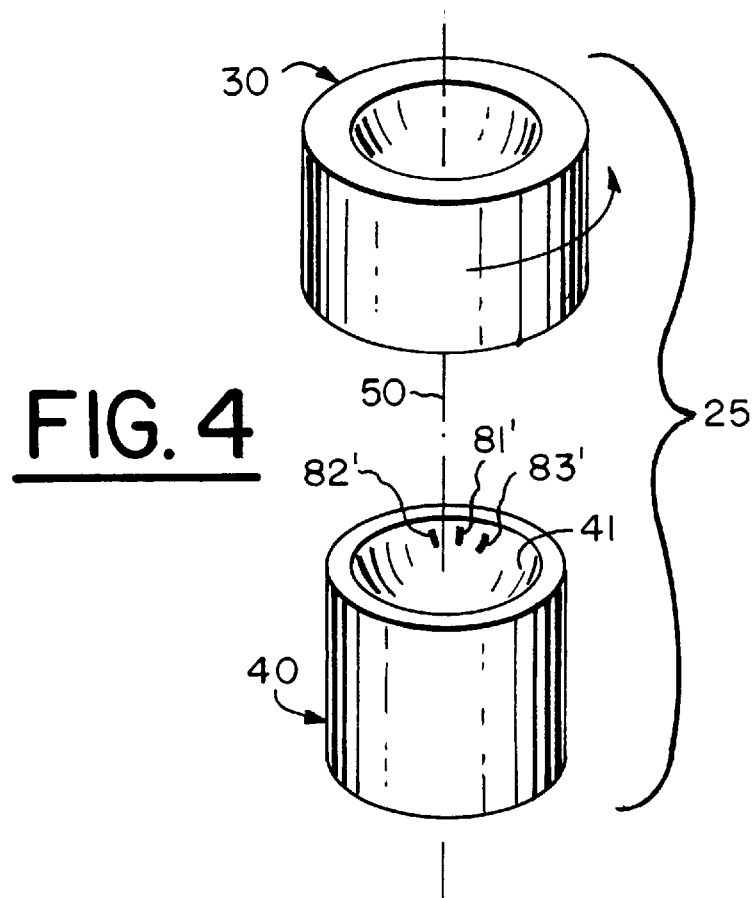
FIG. 4 is a schematic exploded view of one embodiment of a mold assembly for cast molding contact lenses.

FIG. 1 schematically illustrates a representative toric contact lens 1. Central zone 11 of posterior surface 3 is toric, i.e., this zone has a toric surface that provides the desired cylindrical correction. Posterior surface 3 may optionally include at least one peripheral curve 12 surrounding the central toric zone 11. For the described embodiment, central zone 21 of anterior surface 4 is spherical, and the spherical curve is matched with central zone 11 to provide the desired spherical correction to the lens. Anterior surface 4 may optionally include at least one peripheral curve 22 surrounding central zone 21.

Lens 1 is provided with ballast so that the lens maintains a desired rotational orientation on the eye. As one example, schematically shown in FIG. 1, peripheral section 24 may have a different thickness than an opposed peripheral section 25 of the lens periphery. With reference to the embodiment shown in FIG. 2, the ballast is oriented about axis 61. (Hereinafter, for purposes of convenience, this axis will be referred to as the "ballast axis".) As discussed above, toric contact lens prescriptions define the offset of ballast axis 61 from the cylindrical axis 60 of the toric zone by a selected rotational angle. (As used herein, the "offset" is inclusive of rotational angles of 0 degrees or 180 degrees, wherein the cylindrical axis is coincident with the ballast axis.)

The lens includes a first identifiable marking 70 aligned with cylindrical axis 60, and a second marking 80 aligned with ballast axis 61. For the illustrative embodiment, first marking 70 has the form of a visible line segment 71 lying on cylindrical axis 60 and in a peripheral section of the posterior surface. Second marking 80 has the form of a visible line segment 81 lying on ballast axis 61 and a pair of visible line segments 82,83 arranged symmetrically about ballast axis 61, each in a peripheral section of the anterior surface.

FIG. 3 represents another embodiment of the invention. The first marking has the form of a visible dot 72 lying on cylindrical axis 60' on the posterior surface. The second marking has the form of a two visible line segments 84,85 each arranged perpendicular to ballast axis 61' in a peripheral section of the anterior surface.

The first and second markings on the lens can be measured with respect to each other, thereby enabling one to ascertain the axes offset of a given lens. As a first example, a practitioner can measure the markings while the lens is on the eye. As another example, the markings may be machine readable, thereby enabling manufacturing in-line inspection of the axes offset for a given contact lens. It will be appreciated that the exact configuration or shape of the markings is not critical, so long as the markings are indicative of an offset between the cylindrical axis and the ballast axis.

The marks can be placed on the lens by methods generally known in the art. For example, the marks can be etched on the surface of the lens by sublimating the lens material with a high intensity beam of radiation, such as a laser. Such laser etching of depressions in a contact lens are disclosed in U.S. Pat. No. 4,194,814, the disclosure of which is incorporated by reference.

Figure 5:
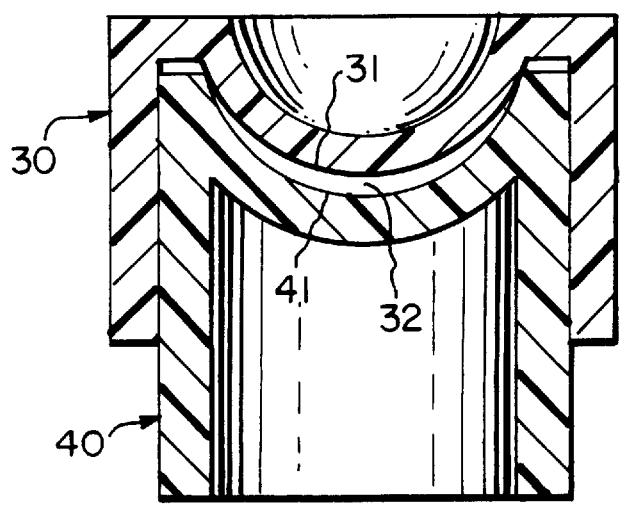
FIG. 5 is a schematic cross-sectional view of an assembled mold assembly shown in FIG. 4.

Alternately, in the case where the lens is cast molded by casting the lens between two mold sections, the marks can be molded directly in the lens. An illustrative mold assembly 25 is shown in FIGS. 4 and 5. The mold assembly includes posterior mold 30 having a posterior mold cavity defining surface 31 which forms the posterior surface of the molded lens, and anterior mold 40 having an anterior mold cavity defining surface 41 which forms the anterior surface of the molded lens. When the mold sections are assembled, a mold cavity 32 is formed between the two defining surfaces that corresponds to the desired shape of the contact lens molded therein. Each of the mold sections is injection molded from a plastic resin in an injection molding apparatus. Depressions corresponding to the desired markings are formed in the tooling used to injection mold the mold sections; these depressions can be formed in the tooling by laser ablation, photochemical etching or machining. Accordingly, the molding surfaces of the mold sections will include corresponding raised portions; then, when contact lenses are molded in the mold sections, depressions corresponding to the desired markings are formed in the molded lens surface.

According to a preferred embodiment of the invention, the lenses are formed by a cast molding process according to the method described in WO 95/20483, the disclosure of which is incorporated herein by reference. For this method, posterior mold cavity defining surface 31 has a toric central zone for forming a toric posterior surface of the toric contact lens that has a cylindrical axis, and anterior mold cavity defining surface 41 has a configuration that will provide ballast to a lens molded in molding cavity 32. Surfaces 31, 41 may also include curves for forming desired peripheral curves on the lens, and the central zones of surfaces 31, 41 may be designed to provide a desired spherical correction to the molded toric lens.

A first depression is formed in tooling for injection molding of posterior mold section surface 31, this first depression being aligned with the cylindrical axis of the posterior toric zone and corresponding to the desired first marking. A second depression is machined in tooling for injection molding of anterior mold section surface 41, this second depression being aligned with the ballast axis. As can be seen in FIG. 4, the second depression results in corresponding raised portions 81',82',83', being formed in anterior mold section surface 41. The first and second markings are replicated on the lens from the molding process.

In molding lenses, the rotational alignment of the anterior and posterior mold sections is adjusted to correspond with the selected offset between the cylindrical axis and the ballast. More specifically, after depositing a curable mixture of polymerizable monomers in anterior mold section 40, posterior mold section 30 may be rotated about axis 50 until alignment of this mold section is adjusted with respect to anterior mold section 40 at the selected rotational position. The mold sections are then assembled, or brought fully together, to assume the configuration shown in FIG. 4 while maintaining the selected rotational position. Alternately, anterior mold section 40 may be rotated about axis 50 until alignment is adjusted at the selected rotational position, followed by assembling the mold sections while maintaining the selected rotational position. Either of the mold sections may include a notch (or protrusion) which is engageable with a protrusion (or notch, respectively) on a support member of the cast molding system, or other means to ensure that this mold section is aligned at a known position with respect to the support member, and rotation of the mold sections with respect to one another can then be controlled to ensure the desired rotational position is maintained.

Subsequent to assembling the mold sections, the monomer mixture is polymerized, such as by exposure to UV light or heat, followed by disassembling the mold assembly and removing the molded lens therefrom. Other processing steps which may be included, depending on the specific process, include lens inspection, hydration in the case of hydrogel contact lenses, and lens packaging.

An advantage of this cast molding method is that it minimizes the unique number of tools to cast mold lenses having different axes offsets.

Although certain preferred embodiments have been described, it is understood that the invention is not limited thereto and modifications and variations would be evident to a person of ordinary skill in the art. As examples, this invention is applicable for ballast types other than that shown in FIG. 1, or the lens may have the toric zone in the anterior surface. Additionally, other forms of markings may be used so long as the markings are aligned with the respective cylindrical and ballast axes, and are visible or machine-readable, and both markings may be placed in the anterior surface or in the posterior surface.

What is claimed is:

1. A toric contact lens comprising:
   a posterior surface and an anterior surface, one of said surfaces including a toric optical zone having a cylindrical axis, and said surfaces shaped to form a ballast oriented about a ballast axis;
   a first identifiable marking on a surface of the lens indicating the cylindrical axis; and
   a second identifiable marking on a surface of the lens indicating the ballast axis,
   wherein the markings are indicative of an offset between the cylindrical axis and the ballast axis.

2. The contact lens of claim 1, wherein the first marking is on the cylindrical axis.

3. The contact lens of claim 2, wherein the second marking is on the ballast axis.

4. The contact lens of claim 2, wherein the first marking includes a visible line segment on the cylindrical axis.

5. The contact lens of claim 1, wherein the second marking includes two visible line segments arranged symmetrically about the ballast axis.

6. The contact lens of claim 5, wherein the two visible line segments are on an axis perpendicular to the ballast axis.

7. The contact lens of claim 5, wherein the second marking further includes a visible line segment on the ballast axis.

8. The contact lens of claim 1, wherein the first and second markings are on peripheral sections of the contact lens outside the optical zone.

9. The contact lens of claim 1, wherein the first marking is on the posterior surface and the second marking is on the anterior surface.

10. A method for marking a toric contact lens including a posterior surface and an anterior surface, one of said surfaces including a toric optical zone having a cylindrical axis, and said surfaces shaped to form a ballast oriented about a ballast axis, said method comprising:

applying a first identifiable marking to a surface of the contact lens identifying the cylindrical axis of the toric zone of the contact lens; and applying a second identifiable marking to a surface of the contact lens identifying the ballast axis of the contact lens, wherein the markings are indicative of an offset between the cylindrical axis of the toric zone and the ballast axis.

11. The method of claim 10, wherein the markings are etched in at least one surface of the lens with laser radiation.

12. A method for marking a toric contact lens including a posterior surface and an anterior surface, one of said surfaces including a toric optical zone having a cylindrical axis, and said surfaces shaped to form a ballast oriented about a ballast axis, said method comprising:

applying a first identifiable marking to a surface of the contact lens that indicates the cylindrical axis of the toric zone of the contact lens; and applying a second identifiable marking to a surface of the contact lens that indicates the ballast axis of the contact lens, wherein the markings are indicative of an offset between the cylindrical axis of the toric zone and the ballast axis, and wherein the contact lenses are molded between first and second mold sections, and molding surfaces of the mold sections have raised portions corresponding to desired first and second markings for the contact lens.

13. The method of claim 12, wherein a molding surface of a posterior mold section includes a raised portion for forming the first marking, and a molding surface of an anterior mold section includes a raised portion for forming the second marking.

\* \* \* \* \*